US005247926A

United States Patent [19]

Harral

[11] Patent Number: 5,247,926

[45] Date of Patent: Sep. 28, 1993

[54] AIRCREW BREATHING GAS REGULATORS

[75] Inventor: Michael W. Harral, Yeovil, England

[73] Assignee: Normalair-Garrett (Holdings) Limited, England

[21] Appl. No.: 797,944

[22] Filed: Nov. 26, 1991

[30] Foreign Application Priority Data

Dec. 22, 1990 [GB] United Kingdom ................. 9027961

[51] Int. Cl.[5] ............................................ B64D 10/00

[52] U.S. Cl. ......................... 128/202.11; 128/204.29; 128/205.24; 128/204.23; 128/204.26; 600/20

[58] Field of Search ...................... 128/202.12, 205.26, 128/201.29, 202.11, 204.18, 204.26, 204.29, 205.24, 204.23, 201.28; 600/19, 20; 2/2.1 A

[56] References Cited

U.S. PATENT DOCUMENTS

| | | | |
|---|---|---|---|
| 2,228,115 | 1/1941 | Holste | 600/20 |
| 2,335,474 | 11/1943 | Beall | 600/20 |
| 3,089,482 | 5/1963 | Gray | 600/19 |
| 3,137,290 | 6/1964 | Gongwer | 600/19 |
| 3,528,414 | 9/1970 | Schaeller | 128/202.11 |
| 3,628,531 | 12/1971 | Harris | 128/202.11 |
| 4,546,491 | 10/1985 | Beaussant | 128/201.23 X |
| 4,858,606 | 8/1989 | Hamlin | 128/204.23 X |
| 4,906,990 | 3/1990 | Robinson | 128/204.23 X |
| 5,007,893 | 4/1991 | Row | 128/201.29 X |
| 5,127,896 | 7/1992 | DeGaston | 128/202.11 X |

FOREIGN PATENT DOCUMENTS

WO91/03278 3/1991 World Int. Prop. O. .

*Primary Examiner*—V. Millin
*Assistant Examiner*—Sebastiano Passaniti
*Attorney, Agent, or Firm*—Larson & Taylor

[57] ABSTRACT

A breathing gas regulator for regulating delivery of breathing gas to an aircrew member wearing a liquid filled G-suit includes a relay valve having a diaphragm mounted valve plate for sensing G-suit hydrostatic pressure. A bleed of breathing gas is supplied to the relay valve by way of a pneumatic link and is vented to ambient through a vent outlet. As G-suit hydrostatic pressure rises due to increasing G-load the valve plate moves towards closing the vent outlet. Above a predetermined G-load, with the vent outlet closed, a pneumatic signal is generated in the pneumatic link and is applied to an end face of a valve controlling outflow from a breathing-pressure control chamber so that pressure in the control chamber increases to set a breathing gas pressure at the regulator outlet appropriate to positive pressure breathing. The regulator provides a low risk solution to interface with a liquid filled G-suit because in the event of leakage of liquid into the relay valve the liquid is able to bleed to ambient through the vent outlet.

9 Claims, 2 Drawing Sheets

AIRCREW BREATHING GAS REGULATORS

BACKGROUND OF THE INVENTION

1. Field of the Invention

This invention relates to aircrew breathing gas regulators and is more particularly concerned with a regulator for use with a liquid filled aircrew G-protection suit.

2. Description of the Prior Art

The enhanced agility of modern high performance aircraft designs give such aircraft the ability to perform highly accelerative maneuver both at low altitudes and at high altitudes, e.g. in excess of 12000 meters (40,000 ft). To take advantage of this agility an aircrew member flying the aircraft must be protected against G-induced loss of consciousness (G-loc), as well as the effect of exposure to high altitude in the event of loss of cabin pressure.

The partial pressure of oxygen in air decreases with increasing altitude (decreasing total pressure) so that the concentration of oxygen in breathing gas supplied to the aircraft aircrew member must be increased with increasing cabin altitude to maintain the oxygen partial pressure above the minimum value necessary for it to be able to diffuse through the lung tissue and pass to the hemoglobin or red corpuscles in the blood. If, at aircraft operating altitudes above 12000 meters, there is total or partial loss of cabin pressure then the overall pressure of the breathing gas delivered to the aircrew member must be increased to a value above cabin ambient pressure so that the minimum critical oxygen pressure is maintained in the lungs, this being referred to as positive pressure breathing (PPB).

Positive pressure breathing at high altitude is aided by exerting pressure around the chest to assist the aircrew member in exhaling used gas from his lungs against the positive pressure in his breathing mask. To meet this requirement the aircrew member wears an inflatable counter-pressure garment ("jerkin") around his chest and back area which is inflated to the same pressure as the pressure in the breathing mask during positive pressure breathing, conveniently by being connected for inflation by breathing gas delivered to the breathing mask.

To counter the effects of high G-load it is usual at the present time for an aircrew member to wear an inflatable G-protection trouser garment which is inflated from a source of high pressure gas, such as engine bleed air. Inflation of the trouser garment may be in response to signals from one or more accelerometers located in the aircraft for sensing accelerative forces, or in response to movement of an inertia mass provided as part of an inflation control valve assembly. When inflated, the trouser garment restricts the flow of blood into the lower extremities of the body where it tends to be forced under the action of the G-load to which the aircrew member is subjected.

It has been found that protection against G-loc is further enhanced by providing positive pressure breathing during periods when high G-loads are being experienced and the G-protection garment is being pressurised. The increase in breathing pressure causes an approximately equal increase in heart level blood pressure thereby increasing the flow of blood to the brain.

Disadvantages of this arrangement are that the aircrew member must don two separate protection garments before commencement of an operation and each garment must have provision for connection to a source of inflation gas.

It is suggested now that protection of an aircrew member might be enhanced by a one piece liquid filled suit extending from ankle to neck. A suitable liquid would be one such as water, having a density approximating with that of blood. When such a liquid filled suit is being worn by an aircrew member sitting in his aircraft on the ground, the suit hydrostatic pressure will increase progressively from the vertically lowest region of the suit, thus being highest in the ankle region where the head of liquid is a maximum. In operation, when the aircraft performs a maneuver giving rise to acceleration along the vertical ($G_z$) axis of the aircraft, the resulting G-force will cause the suit hydrostatic pressure to increase and, the hydrostatic pressure at any position within the suit will be given by the formula:

$$p=(Ng)\rho h$$

where:

p=hydrostatic pressure
N=a number
g=gravitational acceleration
$\rho$=density of liquid in the suit
h=head of liquid at position within suit where hydrostatic pressure is to be calculated In the case of positive accelerations, the increase in hydrostatic pressure in the lower regions of the suit will be greater than the increase in hydrostatic pressure in the upper regions of the suit and this difference will act to restrict the flow of blood into the lower extremities of the body. At the same time the increase in hydrostatic pressure in the chest region of the suit will tend to balance the higher pressure in the lungs of the aircrew member if breathing gas delivered by a breathing gas demand regulator is supplied at a pressure which is scheduled with respect to G (positive pressure breathing with G).

When an air inflatable G-protection garment is being worn, the breathing gas demand regulator may be arranged to be responsive to a pneumatic signal representative of pressure in the G-protection garment in delivering breathing gas for positive pressure breathing. However, such a pneumatic signal is not readily available from a liquid filled suit and there exists a requirement for a breathing gas demand regulator suitable for use with such a suit.

In meeting this requirement care must be taken not to detract from satisfactory operation of the liquid filled G-suit such as might happen if liquid were to leak from the suit. Also, operation of a breathing regulator must not be impaired by leakage of liquid from the suit into the regulator. Electrically operated sensors could be used to sense hydrostatic pressure in the suit but these are both expensive and unreliable.

A liquid filled G-suit in combination with a breathing gas regulator is disclosed in WO-A-9103278 (McDonnell Douglas) published 21 Mar. 1991, after the earliest priority date of the present application. In this disclosure hydrostatic pressure in the G-suit is sensed by a diaphragm which is connected by a mechanical linkage to a valve member regulating flow of breathing gas. A pressure differential across the diaphragm due to breathing demands of an aircrew member wearing the G-suit effects movement of the diaphragm and with it the linkage to cause the valve member to open. A disadvantage of this arrangement is that provision must be made in a supply line from the regulator to a breathing mask worn by the aircrew member, to prevent liquid from the G-suit flowing to the breathing mask in the event of rupture of the diaphragm. The arrangement disclosed in WO-A-9103278 for this purpose increases the breathing effort required of the aircrew member in making demands for breathing gas and, also, introduces an added weight penalty.

An embodiment (FIG. 27) of WO-A-9103278 designed to provide for increasing the pressure of breathing gas supplied to the aircrew member in the event of exposure to high altitude (i.e. low cabin pressure), has a mechnanism including an aneroid capsule which expands on exposure to high altitude to off-load a spring biasing a valve towards closure against the action of hydrostatic pressure of the diaphragm. This arrangement does not meet a current requirement that the higher of breathing gas pressures be provided for protection in the event of simultaneous exposure to G-load and high altitude because the effect of expansion of the aneroid capsule is additive to that of hydrostatic pressure acting through the diaphragm.

It is an object of the present invention to provide an aircraft aircrew breathing gas regulator suitable for use with a liquid filled G-protection suit and which meets the requirement for positive pressure breathing in protecting an aircrew member against G-load and/or exposure to high altitude (low cabin pressure).

SUMMARY OF THE INVENTION

Accordingly, in its broadest aspect, the present invention provides a breathing gas regulator for regulating delivery of breathing gas in response to breathing demands of an aircrew member wearing a liquid filled G-protection suit (G-suit), the regulator comprising breathing pressure control means for controlling pressure of breathing gas at an outlet from the regulator, G-suit hydrostatic pressure sensing means adapted for interface with the G-suit, means for generating a pneumatic signal in response to sensed increasing G-suit hydrostatic pressure, and means for applying the pneumatic signal to the breathing pressure control means to effect an increase in the breathing gas pressure at the regulator outlet appropriate to positive pressure breathing in the presence of G-load above a predetermined value.

The hydrostatic pressure sensing means may comprise relay valve means which senses G-suit hydrostatic pressure and generates a pneumatic signal when hydrostatic pressure rises above a predetermined value. The relay valve means may comprise means for closing vent means venting a bleed flow of gas to ambient, thereby generating the pneumatic signal. The means for closing the vent means may comprise a valve plate which is moved by the action of increasing hydrostatic pressure towards closing with a valve seat.

The valve plate may be carried by a diaphragm adapted for sensing hydrostatic pressure on one of its faces. The diaphragm and valve plate may be biased away from a valve seat by resilient means such as a compression spring acting in opposition to hydrostatic pressure.

The means for applying the pneumatic signal to the breathing pressure control means preferably comprises pneumatic link means connecting between the breathing pressure control means and the pneumatic signal generating means.

The relay valve means may be provided as an integral part of the regulator in which case the pneumatic link means may comprise passage means in a regulator body member.

Alternatively, the relay valve means may be provided as a separate unit to the main regulator in which case the pneumatic link means may comprise a flexible hose connecting between the two units.

Means for supplying a bleed of gas to the pneumatic link means may comprise passage means branching from a breathing gas inlet of the regulator.

Valve means may be provided for closing the bleed gas passage means whereby the relay valve is non-operational and the regulator is not responsive to G-load.

In an embodiment of the invention, the regulator comprises a body member having a breathing gas inlet and a breathing gas outlet, a demand valve for controlling flow of breathing gas through the regulator from the inlet to the outlet, a demand-pressure sensing chamber having communication with the outlet, a breathing-pressure control chamber having communication with aircraft cabin atmosphere ambient of the regulator, a diaphragm dividing the demand-pressure sensing chamber from the breathing-pressure control chamber and having connection with the demand valve in response to breathing demand sensed in the demand-pressure sensing chamber, means for supplying a bleed of breathing gas to the breathing-pressure control chamber, and valve means for controlling flow of breathing gas from the breathing-pressure control chamber to ambient.

Preferably, the control valve means comprises a valve head carried by a valve stem having an end face opposite the valve head adapted for communication with the pneumatic link means. The valve stem preferably has a bore extending therethrough whereby bleed gas from the pneumatic link means may flow to the breathing pressure control chamber to assist in rebuilding pressure therein in the event of collapse of control pressure brought about by extreme excursions of the diaphragm dividing the control pressure chamber from the demand-pressure sensing chamber.

To meet the requirement that the higher of the values for positive pressure breathing be set in the event that the aircrew member is exposed to both high G-load and aircraft ambient pressure at high altitude, aneroid capsule means is located in-line with the valve stem and is adapted to act through a loading member on the end face of the valve stem for movement of the valve head.

BRIEF DESCRIPTION OF THE DRAWINGS

The invention will now be described by way of example and with reference to the accompanying drawing in which.

DETAILED DESCRIPTION OF THE DRAWINGS

Figure 1:
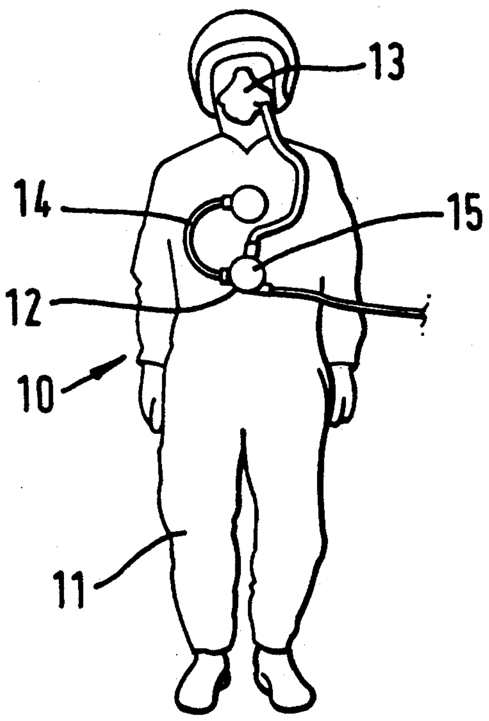
FIG. 1 shows an aircraft aircrew member wearing a liquid filled G-protection suit and a breathing gas regulator in accordance with an embodiment of the present invention.

Referring first to FIG. 1, an aircraft aircrew member 10 is shown wearing a one piece liquid filled G-protection suit (G-suit) 11 which extends from the neck region to the ankles. Mounted on the G-suit is a breathing gas regulator 12 which regulates supply of breathing gas from a source (not shown) to a breathing mask 13 worn by the aircrew member. The regulator 12 is connected by pneumatic link means, which in this embodiment comprises a flexible hose 14, with G-suit hydrostatic pressure sensing means, which in this embodiment is provided by relay valve means 15 having communication with the suit interior, the relay valve means also providing means for generating a pneumatic signal which is fed by the pneumatic link means to the regulator.

Figure 2:
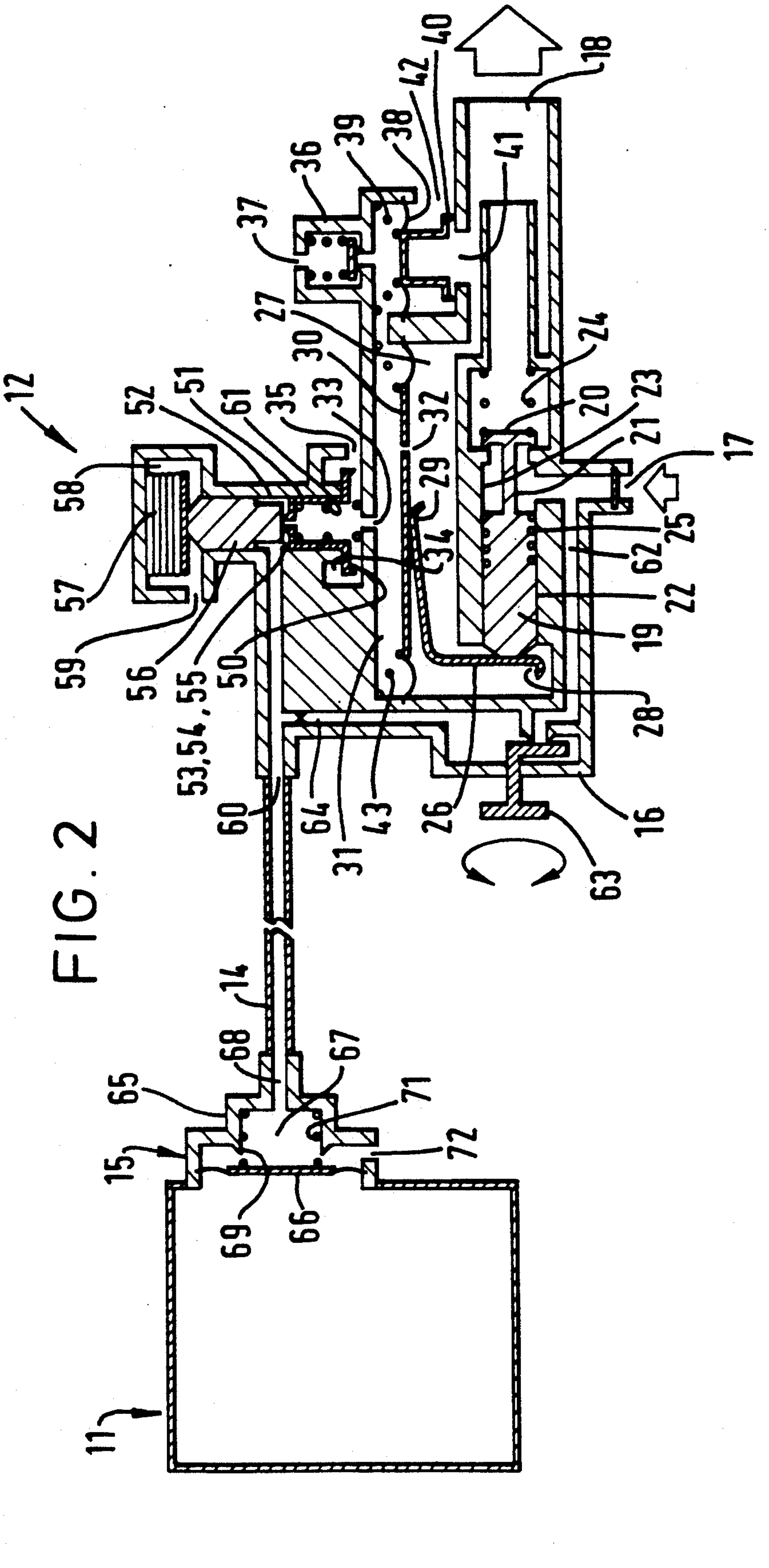
FIG. 2 is a diagrammatic illustration of the regulator and garment shown in FIG. 1.

Referring now to FIG. 2, the regulator 12 comprises a body 16 providing a breathing gas inlet 17 and a breathing gas outlet 18. Flow of breathing gas from the inlet 17 to the outlet 18 in response to demands made at the breathing mask 13 is controlled by a demand-regulator arrangement comprising a demand valve 19 having a valve head 20 supported by a spindle 21 from a spool 22 that slides in a bore 23 in the body 16. The valve head 20 is urged towards a closing position by a compression spring 24 acting on the valve head. The opposed surface of the valve head 20 and the spool 22 are equal so that the valve is balanced by the pressure of the oxygen-enriched air in the inlet 17. The spool 22 is provided on its circumferential surface with grooves 25 in the manner of a labyrinth seal. The end surface of the spool opposite the end surface from which the spindle 21 projects is of conical form and projects from the bore 23 into contact with a valve operating lever 26 housed in a demand pressure sensing chamber 27 and arranged to rock about one of its ends 28. The other end 29 of the lever 26 bears on the center of a diaphragm 30 that divides the demand pressure sensing chamber 27 from a breathing-pressure control chamber 31.

The demand-pressure sensing chamber 27 is arranged to be open to pressure at the outlet 18 while the breathing-pressure control chamber 31 is arranged to receive a bleed of breathing gas from the demand-pressure sensing chamber through an orifice 32 in the diaphragm 30. The breathing-pressure control chamber 31 is arranged to be open to aircraft cabin pressure by way of a passageway 33, a chamber 34 and an outlet 35. Valve means 50, 51 provided within the chamber 34 and hereinafter described in detail, controls outflow of gas from the breathing-pressure control chamber 31 to the aircraft cabin in obtainment of a pressure in the breathing-pressure control chamber appropriate to providing positive pressure breathing at cabin altitudes above 12000 meters or in the presence of high G-loads.

A maximum pressure relief valve 36 provides for venting of excess pressure from the breathing-pressure control chamber 31, via an outlet 37.

Pressure in the breathing-pressure control chamber 31 is applied, to one side of a diaphragm 38 that together with a spring 39 acts to urge a valve head 40 carried by the diaphragm 39 towards closing communication between a vent port 41 in the outlet 18 and a secondary outlet 42 to the aircraft cabin and that enables breathing gas in the outlet 18 to be vented to aircraft cabin.

The valve head 40 is arranged to open when the pressure in the outlet 18 is a prescribed amount higher than that in the breathing-pressure control chamber 31. Typically, the pressure differential required to open this pressure relief valve arrangement is 950 Pa (3.8 inches WG).

The diaphragm 30 is backed by a spring 43 located in the breathing-pressure control chamber 31. This spring acts on the diaphragm to urge it into contact with the lever 26 and the arrangement is such that the force balance of the springs 24 and 43 acting on the diaphragm 30 and demand valve 19 provides a null position for the diaphragm in which the valve head 20 is held off its seat sufficiently to maintain, in operation, a positive (safety) pressure of, say, 375 Pa (1.5 inch WG) in the outlet 18. Means (not shown) may be provided to negate the effort of spring 43 when the regulator is out of use, to prevent wastage of oxygen-enriched air by permitting the valve head 20 to close under the influence of spring 24.

As thus far described the main regulator 12 conforms in principle to a demand regulator described in EP-A-0,263,677 (Normalair-Garrett), and functions in similar manner. That is, with breathing gas available at the inlet 17 the demand valve 19 responds by movement of the diaphragm 30 to phases of the breathing of the aircrew member 10. Breathing cycle pressure exists in the outlet 18 and thus in the demand-pressure sensing chamber 27, being sensed by the diaphragm. This moves downwardly as seen in FIG. 2, during inhalation so as to cause opening movement of the valve 19, whereas exhalation causes the diaphragm to move upwardly to permit the valve 19 to close.

The valve means provided within the chamber 34 comprises a valve head 50 located in the chamber 34 and carried by a hollow stem 51 that is open at the valve head and which slides in a bore 52 in the body 16. At an opposite end face 53 of the stem 51 a valve seat 54 is provided and a bore 55 extends through the end face between the valve seat 54 and the interior of the hollow stem. A loading member 56 carried by an aneroid capsule 57 is slidable in the bore 52 and is urged by expansion of the capsule 57 towards closing with the valve seat 54. The aneroid capsule 57 is located in a chamber 58 which is open to aircraft cabin pressure by way of a port 59. The end face 53 of the stem 51 is communicated with a passageway 60 which connects with the pneumatic link hose 14. The valve head 50 is biased towards opening communication between the passageway 33 and the outlet 35 of the chamber 34, by a compression spring 61.

A branch passageway 62 from the breathing gas inlet 17 is joined by way of an on/off valve 63 with a restricted passageway 64 that connects with the passageway 60. With the valve 63 in the open position a bleed of breathing gas is supplied by way of the pneumatic link means comprising the flexible hose 14 to the relay valve means 15.

The relay valve means 15 comprises an open sided hollow body member 65 joined with the outer skin of the G-suit 11 so that hydrostatic pressure in the G-suit is sensed by one side of a diaphragm mounted valve plate member 66 which defines with the body member 65 a chamber 67. The chamber 67 receives a bleed of breathing gas by way of an inlet 68 which is connected with the flexible hose 14. A valve seat 69 is provided internally of the chamber 67 and a compression spring 71 acts between the body member 65 and the valve plate member 66 to bias the member 66 away from the valve seat 69 whereby the chamber 67 is communicated with aircraft cabin pressure by way of a vent outlet 72 in the body member 65.

In operation, with breathing gas available at the inlet 17 and the regulator functioning as hereinbefore described to deliver breathing gas to the face mask 13 worn by the aircrew member, the on/off valve 63 is placed in an open position if it is anticipated highly accelerative maneuvers giving rise to high G-loads, say 2G or more, will be flown. A bleed of breathing gas is supplied to the relay valve 15 by way of passageway 62, restricted passageway 64, passageway 60 and the flexible hose 14. With loads of say less than 2G acting on the aircrew member, the valve member 66 is held off the valve seat 69 and the bleed of breathing gas is vented to aircraft cabin by way of the vent outlet 72. When the aircraft flies a maneuver which results in a G-load along the $G_z$ axis exceeding 2G, the hydrostatic pressure increases throughout the G-suit. Since the diaphragm mounted valve plate member 66 of the relay valve means 15 senses hydrostatic pressure (p) at one position within the G-suit, the hydrostatic pressure at that position is directly proportional to acceleration (Ng). The increase in pressure is a function of N (the g level) and is used to generate a schedule of positive pressure breathing with G.

Hydrostatic pressure increase sensed by the valve plate member 66 acts to overcome the bias of the compression spring 71 so that the valve plate member is moved towards closing with the valve seat 69. This results in a back pressure building up in the flexible hose 14 and the passageway 60, to provide a pneumatic signal which acts on the end face 53 of the valve stem 51 to overcome the bias of the compression spring 61 so that the valve head 50 carried by the stem 51 is moved towards restricting the outflow from the breathing pressure control chamber 31 to the outlet 35. This causes pressure in the chamber 31 to rise and increase the deflection of the diaphragm 30 for any given pressure in the outlet 18 and chamber 27. The demand valve 19 thus tends to maintain an increased pressure in the outlet 18 and, hence, in the breathing mask 13. The increase in pressure in chamber 31 is also applied to the diaphragm 38 of the relief valve arrangement. Thus pressure in the breathing regulator outlet and hence in the breathing mask depends on pressure in the suit and the appropriate schedule between the two pressures may be obtained by selection of areas and spring loads.

The bore 55 in the end face 53 of the valve stem 51 provides means whereby gas may flow from the passageway 60 to the breathing-pressure control chamber 31 to assist in rebuilding pressure therein in the event of collapse of control pressure brought about by extreme excursion of the diaphragm 30.

In similar manner, in the event of the cabin altitude rising above 12000 meters the aneroid capsule 57 expands to move the valve head 50 towards increasing the restriction to outflow from the chamber 31 to the outlet 35 and so result in a raising of the breathing gas pressure at outlet 18 thereby to maintain a physiologically acceptable level of oxygen partial pressure in the breathing gas supplied to the aircrew member during flight at cabin altitudes in excess of 12000 meters.

If a highly accelerative maneuver is flown with the cabin altitude in excess of 12000 meters, the hydrostatic pressure in the G-suit is effective, as previously described, to move the valve plate member 66 towards closing with the valve seat 69. The resulting pneumatic signal produced by increased pressure in the flexible hose 14 and passageway 60 is sensed by the end face 53 of the valve stem 51 and, if the G-load is such as to require a further increase in breathing gas pressure over that set by the aneroid capsule 57, the valve head 50 is moved to further increase the restriction to outflow from the chamber 31 and, hence further increase the breathing gas pressure at outlet 18. However, in the event that cabin altitude is the higher of the two requirements the pressure on the end face 53 is ineffective. Thus, the pneumatic signal and the aneroid capsule 57 coact with the valve stem 51 and valve head 50 to control pressure in the control chamber 31 so that breathing gas pressure at outlet 18 is set by the higher of the two requirements for protection against the effects of altitude and G-load when the aircraft performs maneuvers giving rise to G-load at altitudes in excess of 12000 meters.

A breathing gas regulator in accordance with the present invention offers a low risk solution to the problem of interfacing the regulator with a liquid filled suit in obtainment of positive pressure breathing with G. No electrical functions are required for operation of the regulator and the pneumatic link provided by the flexible hose minimises the possibility of liquid from the G-suit leaking into the main body of the regulator because in the event of rupture of diaphragm 66 the liquid is able to bleed to ambient through vent outlet 72.

In the embodiment hereinbefore described with reference to the accompanying drawing, the pneumatic link means between the regulator 12 and the relay valve means 15 is comprised by the flexible hose 14 so that the positive pressure breathing with G schedule is not affected by the physical position of the regulator but only by that of the relay valve which is fitted to the suit. However, it should be appreciated that the pneumatic link means may be provided by other arrangements. For example, the relay valve means may be formed as an integral part of the regulator so that the inlet 68 is a continuum of the passageway 60 and forms the pneumatic link means which will require that the regulator be attached at the correct position on the G-suit.

what is claimed is:

1. A breathing gas regulator for regulating delivery of breathing gas in response to breathing demands of an aircrew member wearing a liquid filled G-protection suit (G-suit), the regulator comprising breaching pressure control means for controlling pressure of breathing gas at an outlet from the regulator, G-suit hydrostatic pressure sensing means adapted for interface with the G-suit, the G-suit hydrostatic pressure sensing means comprising relay valve means for controlling venting of a bleed flow of breathing gas to ambient in response to sensed increasing G-Suit hydrostatic pressure whereby a pneumatic signal is generated, and means for applying the pneumatic signal to the breathing pressure control means to effect an increase in the breathing gas pressure at the regulator outlet appropriate to positive pressure breathing in the presence of G-load above a predetermined value.

2. A regulator as claimed in claim 1, wherein the relay valve means comprises a diaphragm mounted valve plate adapted for movement by the action of increasing hydrostatic pressure towards closing with a valve seat.

3. A regulator as claimed in claim 2, wherein the diaphragm mounted valve plate is biased away from the valve seat by resilient means acting in opposition to hydrostatic pressure.

4. A regulator as claimed in claim 1, wherein the means for applying the pneumatic signal to the breathing pressure control means comprises pneumatic link means connecting between the breathing pressure control means and the relay valve means.

5. A regulator as claimed in claim 4, wherein the pneumatic link means comprises a flexible hose.

6. A regulator as claimed in claim 4, including passage means branching from a breathing gas inlet of the regulator for supplying a bleed of gas to the pneumatic link.

7. A regulator as claimed in claim 6, wherein the valve means are provided for closing the bleed gas passage means whereby the relay valve means is rendered non-operational and the regulator is not responsive to G-load.

8. A regulator as claimed in claim 1, wherein the breathing pressure control means comprises a breathing-pressure control chamber fed with breathing gas to develop a control pressure therein determining breathing gas pressure at the regulator outlet, aneroid means for controlling outflow from the control chamber to increase breathing gas pressure appropriate to positive pressure breathing above a predetermined aircraft cabin altitude, and valve means responsive to the pneumatic signal for controlling outflow from the control chamber to increase breathing gas pressure appropriate to positive pressure breathing in the presence of G-load above a predetermined value, the aneroid means and the pneumatic signal coacting with control valve means such that in the presence of simultaneous exposure to increased altitudes above said predetermined aircraft cabin altitude and increased G-loads above a predetermined value, breathing gas delivery pressure is increased appropriately to provide an aircraft member with protection against the higher of either the increased altitude or the increased G-loads.

9. A breathing gas regulator for regulating delivery of breathing gas in response to breathing demands of an aircrew member wearing a liquid filled G-protection suit (G-suit), the regulator comprising a body member having a breathing gas inlet and a breathing gas outlet, a demand valve for controlling flow of breathing gas through the regulator from the inlet to the outlet, a demand-pressure sensing chamber having communication with the outlet, a breathing-pressure control chamber having communication with aircraft cabin atmosphere ambient of the regulator, a diaphragm dividing the demand-pressure sensing chamber from the breathing-pressure control chamber and having connection with the demand valve in response to breathing demand sensed in the demand-pressure sensing chamber, means for supplying a bleed of breathing gas to the breathing-pressure control chamber, control valve means comprising a valve head carried by a valve stem for controlling flow of breathing gas from the breathing-pressure control chamber to ambient, aneroid means located in-line with the valve stem and adapted to act on an end face of the valve stem opposite the valve head to move the control valve means to control outflow from the control chamber above a predetermined aircraft cabin altitude, relay valve means adapted for interface with the G-suit, pneumatic link means connecting between the control valve means and the relay valve means, and means for supplying a bleed of breathing gas to the pneumatic link means; the relay valve means comprising means for sensing G-suit hydrostatic pressure, vent means for venting the bleed of breathing gas from the pneumatic link means to ambient, and means for closing the vent means when G-suit hydrostatic pressure is sensed to have risen above a predetermined valve, whereby a pneumatic signal is generated in the pneumatic link means which acts to move the control valve means to control outflow from the control chamber, the aneroid means and the pneumatic signal coacting with the control valve means such that in the presence of simultaneous exposure to increased altitudes above said predetermined aircraft cabin altitude and increased G-loads above a predetermined value, breathing gas delivery pressure is increased appropriately to provide an aircraft member with protection against the higher of either the increased altitude or the increased G-loads.

* * * * *